A. HUETTER.
EXPANSIBLE CORE FOR VEHICLE TIRES.
APPLICATION FILED APR. 19, 1920.
1,368,631.
Patented Feb. 15, 1921.
2 SHEETS—SHEET 1.
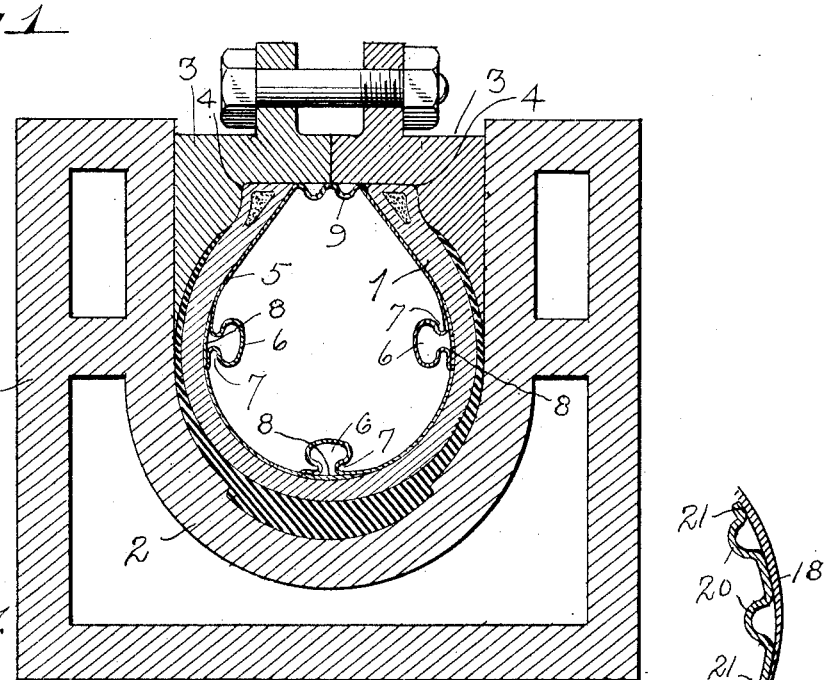
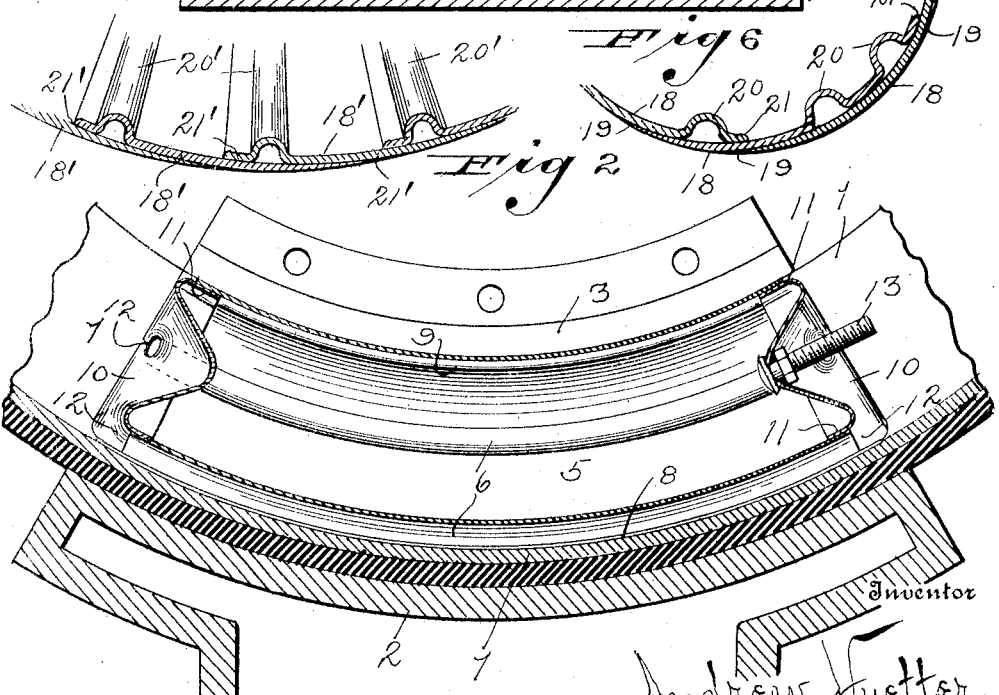

A. HUETTER.
EXPANSIBLE CORE FOR VEHICLE TIRES.
APPLICATION FILED APR. 19, 1920.
1,368,631.
Patented Feb. 15, 1921.
2 SHEETS—SHEET 2.
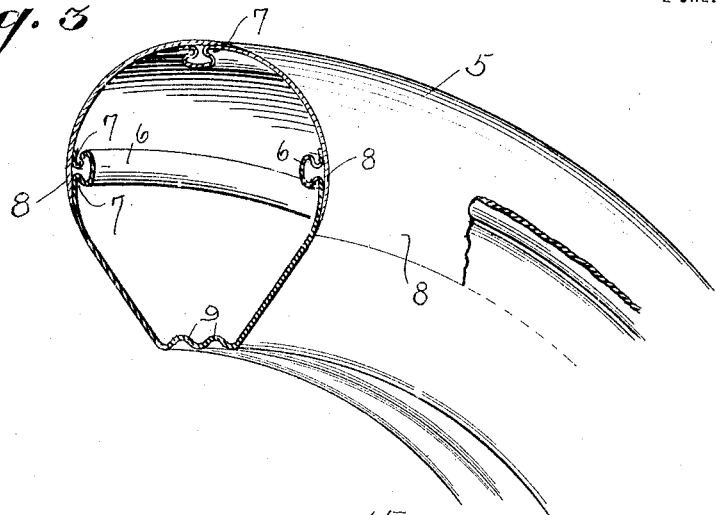
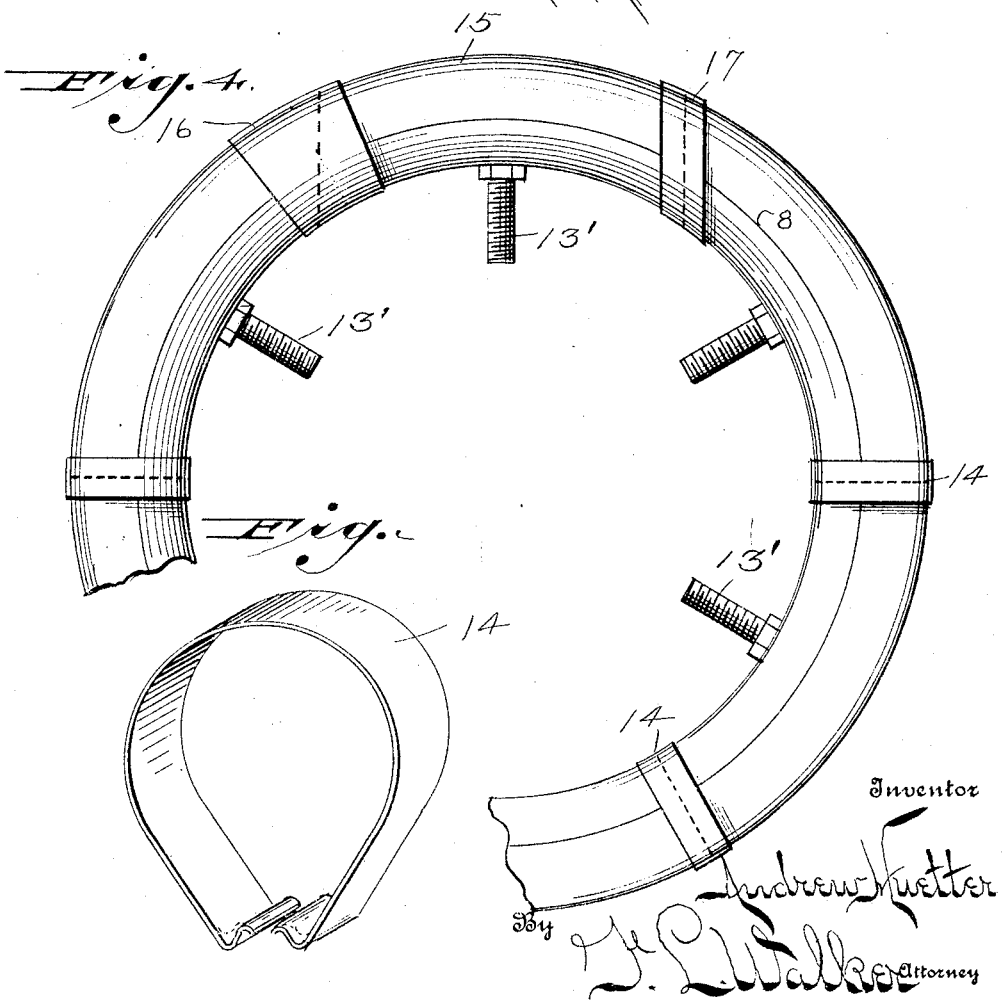

UNITED STATES PATENT OFFICE.

ANDREW HUETTER, OF DAYTON, OHIO.

EXPANSIBLE CORE FOR VEHICLE-TIRES.

1,368,631.

Specification of Letters Patent.　Patented Feb. 15, 1921.

Application filed April 19, 1920. Serial No. 374,982.

*To all whom it may concern:*

Be it known that I, ANDREW HUETTER, a former subject of the Emperor of Austria, residing at Dayton, in the county of Montgomery and State of Ohio, have invented certain new and useful Improvements in Expansible Cores for Vehicle-Tires, of which the following is a specification.

This invention relates to molds for plastic material, and more particularly to an expansible core or inflatable air bag for use in the manufacture and repair of pneumatic tires for vehicles.

The object of the invention is to simplify the structure, as well as the means and mode of operation of such expansible cores, whereby they will not only be cheapened in construction, but will be more efficient in use, positive in operation, uniform in action, of increased durability, and unlikely to get out of repair.

A further object of the invention is to provide a flexible expansible core or air bag from sheet metal, in which the expansion is distributed throughout the cross-sectional outline of the form.

It has heretofore been customary to employ expansible cores or air bags made of fabric or of rubber, or a combination of fabric and rubber, which, however, are capable of use only a limited number of times, due to their deterioration under the heat of repeated vulcanizing operation, whereby they soon lose their elasticity and become hardened and set in form, and hence useless. One of the primary objects of the present invention is to provide an improved form of metallic core possessing the desired degree of flexibility and capability of expansion, which will readily withstand the high temperatures, to which it is subjected in the vulcanizing of vehicles tires, hence necessitating infrequent replacement, and materially decreasing the cost of such cores.

A further object of the invention is to provide a sectional core, which may be employed for repair purposes or interconnected in series to form a continuous demountable core for the manufacture of new tires as well as the repair of old ones.

A further object of the invention is to provide improved means for interconnecting the several sections of such core into an annulus.

With the above primary and other incidental objects in view, as will more fully appear in the specification, the invention consists of the features of construction, the parts and combinations thereof, and the mode of operation or their equivalents as hereinafter described and set forth in the claims.

Referring to the drawings, Figure 1 is a transverse sectional view of a repair mold containing a tire with the expansible core or air bag forming the subject matter hereof, in place within the tire. Fig. 2 is a longitudinal sectional view of the expansible core or air bag inclosed within the tire, and repair mold, or matrix. Fig. 3 is a sectional perspective view of a portion of the core or air bag removed from the tire. Fig. 4 is a plan view of a series of core units interconnected to form a continuous demountable core. Fig. 5 is a detail perspective view of one of the coupling sleeves for the core units. Figs. 6 and 7 are detail views of modifications.

Like parts are indicated by similar characters of reference throughout the several views.

In the drawings, there has been shown a vehicle tire casing 1, inclosed within the usual form of sectional matrix or repair mold 2, as is customarily employed for vulcanizing patches or retreading short sections of the tire in repair shops, or in repair departments of factories. The tire is held within the mold by a pair of bead forming rings 3, which are shaped on their inner side to conform to the inner side walls and inner edges of the casing. This mold or matrix forms no part of the present invention, and has been shown merely for illustrative purposes, as has also the particular shape and design of the tire casing. It is to be understood that the matrix or mold and the tire produced thereby may be varied in shape and proportion.

The present invention relates to the inserted hollow expansible core 5, which is formed from flexible sheet material having heat resistance properties. It has been found in practice that sheet metal particularly copper is suitable for this purpose, although other materials may be equally desirable. The core 5 comprises a hollow segmental unit, the cross sectional contour of which conforms approximately to the interior outline of the tire casing to be produced. At spaced intervals, throughout the transverse contour of the core, the walls thereof are formed with reëntrant loops or plaits 6. While only three of these loops or plaits 6 have been shown in the drawings, it is to be understood that they may be provided in any desired number at greater or less intervals about the side walls and tread or peripheral portions of the tire. These reëntrant loops or plaits are contracted adjacent to the contour lines of the core as at 7, whereby the transverse outline of the core will be as nearly continuous as possible when in its contracted condition. In other words, the core is provided with a series of longitudinally disposed slots in its outer wall, which are comparatively narrow in width and communicate with longitudinal passages of greater extent within the core formed by the widening of the reëntrant loops or plaits. These reëntrant loops or plaits by their distention compensate for the expansion of the core or air bag. By locating a series or plurality of these plaits at frequent intervals in the wall of the core or air bag, the unit is caused to expand substantially uniformly throughout its cross sectional contour or outline. To prevent the material of the tire being forced or crowded into the longitudinal slot or spaces opened up by these expansions of the core unit, and consequent distention of the reëntrant loop or plait, there is provided a shield extension 8, attached to the wall of the core unit, at one side of the slotted orifice of the plait, and extending across such slotted orifice with its free edge bearing upon the outer surface of the core wall. This free edge of the shield flap 8 is preferably reduced to a feather edge, whereby it will merge easily into the outline of the core unit. This shield flap 8 closes at all times the slotted entrance to the reëntrant loops or plaits 6, while permitting the free distention of these loops or plaits, and consequent expansion of the core unit beneath such shield flap. Intermediate the beads 4 of the tire, the wall of the core 5 is provided with a series of longitudinal corrugations 9, which by their deflection compensate for the expansion of the core at this point. The wall of the core may be formed of a continuous sheet of material, having the plaits 6 formed therein with the shield flap 8 separately formed and secured to the exterior of the core walls by soldering, brazing, welding or other suitable means, the joints being finished to a flush even contour, or in lieu thereof, the walls of the core may be formed of separate strips, each having formed at one end thereof a plait or loop 6 and the opposite edge of the strip being formed to afford the shield flap 8 and overlie the plait or loop of the succeeding strip, the edge of the fold or plait of which is secured to the inside surface thereof. There are obviously several ways of producing the core which will readily occur to the skilled sheet metal worker.

The ends of the core are closed by caps 10, of concave or cup-shaped form, which project inwardly and have reversed marginal flanges 11, which may engage the outside of the side walls of the core unit, but preferably to preserve the smooth exterior contour are extended within such side walls as shown in Fig. 2, and secured by brazing, welding, soldering or otherwise. The periphery of the cup-shaped ends is contoured to agree with the cross sectional contour of the side walls of the unit, and hence have passages therein agreeing with the longitudinal plaits or reëntrant loops 6 of the side walls. These peripheral passages 12 in the terminal heads 10 are formed flaring or bell mouthed as shown in Fig. 2 and the juncture of the concave or cup portion of the head 10 and the peripheral flange 11 is upon such radius as to afford a well rounded easy edge, which will yield under internal pressure to compensate for the expansion of the side walls. It will be understood that the heads 10 yield under internal pressure both by the reduction of the concavity of these heads, and by expansion of the periphery due to the inturned folds or plaits 12 which agree with and form continuation of the plaits 6 of the side walls. When the core unit is to be used singly for repair purposes, the inflation valve 13 is preferably located in one of the concave heads of the unit, as shown in Fig. 2. However, when the units as heretofore described, are to be used in series to form a continuous demountable core for the mounting of the green tire during process of manufacture, the inflation valves are located upon the inner corrugated surface of the tire, as shown in Fig. 4 at 13'. In order to hold the cores in assembled series as shown in Fig. 4, there are provided coupling bands or sleeves 14 slidable upon the core units 5 to overlap the adjacent ends of successive units. These bands or sleeves are preferably split or separated on their inner side and are shaped to yieldingly engage in the inner corrugations of the core unit. The continuous core having been assembled and the tire built, and cured thereon an instrument is introduced between the casing and the core and the casing pried loose. At the same time the coupling bands 14 may be pried loose at their inner ends from engagement with the corrugations of the core unit, and thereafter by a flat blade or tool, preferably shaped to agree with the contour of the core introduced between the casing and core, these sleeves are pushed laterally to free the interconnected unit. To facilitate the removal of the core unit from within the finished casing, one of these units comprises a key member which is first to be removed.

This key member has its opposite ends formed parallel one with the other and the adjacent units of the series have one head correspondingly formed to agree with the head of the key member 15. This enables the key unit 15 to be drawn inward in a radial direction upon disengagement of the coupling sleeve or band whereas the remaining unit can not be so drawn because of the radial relation of the contacting heads. To interconnect the key member 15 with the adjacent unit, a wide coupling sleeve or band may be employed as at 16, or a band or sleeve of less width but shaped to assume a position inclined to the periphery of the unit may be employed as shown at 17.

In using the expansible core or air bag heretofore described, the tire is assembled within the matrix or mold and the air bag within the tire as shown in Fig. 1, either singly for repair purposes or in series for the manufacture of new tires, and the core is expanded by fluid pressure applied to the interior of the core, through the inflation valve before mentioned. The pressure may be of any suitable character, as water, oil, or gas, but is preferably air pressure. The expansion of the core presses the tire in contact with the inner walls of the mold or matrix, such expansion being permitted by the reëntrant loop or plaits 6. Owing to its metallic construction whereby it is not easily damaged and its ability to withstand repeated high temperatures for long periods of use, the present form of core or air bag is superior to those commonly in use. Moreover the arrangement and location of the reëntrant loops or plaits at frequent spaced intervals throughout the side and tread walls of the core afford a more uniform expansion or distention, whereby every portion of the tire is subjected to a like pressure. Being sectionally formed or in separable units, the core or air bag is interchangeably applicable to the repair of tire casings or the manufacture of new tires.

A further advantage of the present type of core or air bag is found in its application for repair purposes whereby patches or new sections in a repaired tire may be vulcanized by the circulation of live steam to the interior of the core, or air bag. The live steam in such case not only serves to expand or distend the core or air bag, to afford the necessary pressure, but also affords the necessary vulcanizing heat upon the interior of the tire casing. The application of steam heated inserts or cores for vulcanizing purposes is not new in the art. It has heretofore been a common practice to vulcanize tires without the use of an external mold or matrix by employing a heated core, over which the casing is positioned, and then wrapping the casing with tape or other flexible tension means. These wrappings usually have included an adjustable tightening member, which at the completion of the wrappings is adjusted to tension the wrappings and so draw the tire to be vulcanized into close contact with the inserted form or core. It will be understood that these forms or cores heretofore used have been rigid and not expansible. The tensioning of the wrapping of the tire exerts the greatest pressure upon the tread, and moreover the tensioning movement being in a radial direction, the pressure exerted is not uniform throughout the length of the inserted mold or core. By the use of the present improved form of expansible metal core, or air bag, the pressure exerted from the interior of the tire by the expansion of the core will be uniform in all directions, and will thus be distributed evenly throughout the segments of the tire engaged not only upon the tread, but upon the side walls as well.

In Fig. 6 there is shown a modification of the construction in which the shell is transversely expansible and comprises a series of overlapping plates 18, each of which is reduced to a feather edge at 19. The reduced edges of these plates each overlie the next succeeding plate. Each plate 18 is formed into an expansion joint or bead 20, within the overlapped portion. There may be one or more of these expansion joints or beads. Each plate 18 is fixedly secured to the preceding plate by yielding bracing or other suitable means at the points 21, the overlapping portions of the plates being independent for relative sliding movement one upon the other to compensate for the expansion of the shell. In Fig. 7 there is shown a further modification involving a structure similar to that shown in Fig. 6 heretofore described except that the shell is expansible circumferentially and the sections 18' are annular in a transverse relation with the shell rather than circumferentially as in Fig. 6. The expansion circumferentially of the shell is effected by the distention of the transverse corrugations 20'. The transverse overlying sections are interconnected one with the other at 21' the overlapping portions being independent for relative sliding movement one upon the other.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A core for tires comprising a flexible shell having in the wall portions thereof abutting upon the tire a plurality of longitudinally disposed spaced internal plaits expansible under the influence of internal pressure to permit the distention of said core, and means for applying pressure to the interior of the core.

2. An expansible core for tires comprising an arcuate flexible shell having its lateral side walls and external circumferential surface longitudinally corrugated, whereby the circumferential surface and side walls are transversely expansible under the influence of internal pressure and means for applying pressure to the interior thereof.

3. An expansible core for tires comprising an arcuate shell having a longitudinally disposed reëntrant corrugation in the external circumferential surface thereof substantially coincident with the tread portion of the tire adapted to compensate for the distention of the core under the influence of internal pressure, and means for applying pressure thereto.

4. An expansible core for tires comprising an arcuate shell having a longitudinally disposed reëntrant corrugation in the lateral side wall thereof, substantially coincident with the side wall of the tire, adapted to compensate for the distention of the core under internal pressure, and means for applying pressure thereto.

5. An expansible core for tires comprising an arcuate shell having in the walls thereof a plurality of longitudinally disposed reëntrant corrugations overlaid by the tire and capable of distortion under internal pressure to compensate for distention of the core by internal pressure and means for applying pressure to the interior thereof.

6. An expansible core for tires comprising an arcuate shell having corrugated lateral and external circumferential walls, and means for applying internal pressure to expand said core.

7. An expansible core for tires comprising a flexible shell of inexpansible material having in the surfaces thereof abutting the tire, a plurality of spaced yielding formations adapted to yield under internal pressure to permit the expansion of the shell under internal pressure and means for applying pressure thereto.

8. In an expansible core for tires, a shell comprising a plurality of longitudinally disposed sections of flexible, but inexpansible material and intermediate longitudinally disposed yielding joints connecting the said sections and adapted to yield under internal pressure to permit the distention of the shell, and means for applying internal pressure.

9. In an expansible core for tires a shell comprising a plurality of relatively movable sections, of inexpansible material in that portion of the shell overlaid by the tire, yielding joints intermediate said sections also overlaid by the tire, and means for applying internal pressure to effect an expansion of the shell by the distention of said joints.

10. In an expansible core for tires, a shell comprising a plurality of relatively movable inexpansible sections overlapping one upon another and yielding joints connecting said sections beneath said overlapping portions.

11. In an expansible core for tires, a metallic shell having in the walls thereof a series of corrugations adapted to compensate for the expansion of said shell and an external cover for said corrugations supporting the overlying portion of tire.

12. In an expansible core for tires, a corrugated shell and external guard means interposed between the corrugated portion of the shell and the overlying tire body.

13. In an expansible core for tires, a shell having corrugations in the side wall and tread portions and extensions of the walls of the shell overlapping said corrugations.

14. In an expansible core for tires, a shell having in that portion abutting upon the tire, a plurality of longitudinally disposed corrugations, and guard flanges attached to the shell at one side of such corrugations and extending thereacross, the opposite edges of said guard flanges being free, substantially as specified.

15. In an expansible core for tires, a tubular expansible body portion, concave heads therefor having reversed marginal flanges engaged with the tubular body portion, and means for applying internal pressure to expand the core.

16. In an expansible core for tires, a tubular body portion having longitudinal corrugations in the side walls thereof, a concavo-convex head for said body having a laterally turned marginal flange, said marginal flange having therein a plurality of reëntrant bights agreeing with the corrugations of the body portion to which the marginal flange is attached.

17. In an expansible core for tires, a tubular expansible body having therein expansion joints comprising reëntrant substantially T-shaped bights of flexible material, and means for applying internal pressure to distend said bights.

18. In an expansible core for tires, a tubular expansible body having therein expansion joints comprising internal bights of material, partially compressed into oppositely disposed folds having normally a substantially closed orifice, and means for applying internal pressure to said body to expand said bights.

19. An expansible core for tires, comprising a tubular body having therein a plurality of internal longitudinally disposed box plaits, and means for applying internal pressure to distend said plaits.

20. A core for tires, comprising a metallic shell formed with flexible walls and means in that portion of the walls which contacts the tire to permit the expansion of the shell and means to apply pressure within the shell.

21. In a tire core, an expansible shell comprising a plurality of interconnected overlapping sections each section having therein an expansible joint in the overlapped portion, said shell being adapted to yield under the influence of internal pressure.

22. In a tire core, a series of separable expansible sections adapted when combined to form an annulus, each section comprising an independently inflatable shell substantially as specified.

23. In a tire core, an annulus comprising a series of separable independently inflatable expansible members, and means for detachably engaging said members one with another to form said annulus.

In testimony whereof, I have hereunto set my hand this 16th day of April, 1920.

ANDREW HUETTER.

Witnesses:
E. E. DUNCAN,
G. C. HELMIG.